US008527165B2

(12) United States Patent
Steinlage et al.

(10) Patent No.: US 8,527,165 B2
(45) Date of Patent: Sep. 3, 2013

(54) DUAL POWERTRAIN MACHINE SPEED LIMITING

(75) Inventors: Justin Lee Steinlage, Mackinaw, IL (US); David Richard Wisley, Peoria, IL (US); Fazal Ahmad Goraya, Peoria, IL (US); Brian Allen Byers, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 230 days.

(21) Appl. No.: 13/183,917

(22) Filed: Jul. 15, 2011

(65) Prior Publication Data

US 2013/0018555 A1    Jan. 17, 2013

(51) Int. Cl.
  *B60W 10/10*    (2012.01)
(52) U.S. Cl.
  USPC ................. 701/54; 701/70; 701/110
(58) Field of Classification Search
  USPC ............. 701/22, 36, 54, 70, 99, 110
  See application file for complete search history.

(56) References Cited

U.S. PATENT DOCUMENTS

| 3,512,277 | A |  | 5/1970 | Stuller |  |
|---|---|---|---|---|---|
| 4,203,375 | A |  | 5/1980 | Miller |  |
| 4,207,692 | A |  | 6/1980 | Hyler et al. |  |
| 4,702,082 | A |  | 10/1987 | Kobelt |  |
| 5,447,132 | A | * | 9/1995 | Shoda et al. | 123/357 |
| 5,771,860 | A |  | 6/1998 | Bernardi |  |
| 6,030,315 | A |  | 2/2000 | Bellinger |  |
| 6,922,619 | B2 |  | 7/2005 | Baig et al. |  |
| 6,945,344 | B2 |  | 9/2005 | Stummer |  |
| 2008/0053402 | A1 |  | 3/2008 | Hawkins et al. |  |
| 2009/0043460 | A1 |  | 2/2009 | Morey et al. |  |
| 2009/0111652 | A1 |  | 4/2009 | Reedy et al. |  |
| 2010/0018727 | A1 |  | 1/2010 | Garlton et al. |  |
| 2010/0121543 | A1 |  | 5/2010 | Landes et al. |  |

FOREIGN PATENT DOCUMENTS

WO    2009128815    10/2009

* cited by examiner

*Primary Examiner* — Richard M. Camby
(74) *Attorney, Agent, or Firm* — Liell & McNeil

(57) ABSTRACT

A method of limiting machine speed of a dual powertrain machine includes propelling the dual powertrain machine by transmitting power from a first engine of a first electronically controlled powertrain to a first set of ground engaging elements, and transmitting power from a second engine of a second electronically controlled powertrain to a second set of ground engaging elements. The method also includes identifying a machine speed limit, executing a first machine speed limiting algorithm in a first controller of the first electronically controlled powertrain to determine a first engine control command based on the machine speed limit, and controlling the first engine using the first engine control command. A second machine speed limiting algorithm is executed in a second controller of the second electronically controlled powertrain to determine a second engine control command based on the machine speed limit, and the second engine is controlled using the second engine control command.

18 Claims, 4 Drawing Sheets

DUAL POWERTRAIN MACHINE SPEED LIMITING

TECHNICAL FIELD

The present disclosure relates generally to a method of limiting machine speed of a dual powertrain machine, and more particularly to determining control commands for first and second engines of the dual powertrain machine based on a machine speed limit.

BACKGROUND

Earthmoving equipment is used to perform a variety of operations, including loading, or capturing, material, such as soil, at one location and dumping, or depositing, the material at another location. For example, such material movement may be employed to adjust elevations at a project site. Scrapers, which typically provide quick load, dump, and maneuver time, may be used to perform such operations, and generally include a machine having a bowl within which material may be captured, and a cutting edge located adjacent a cut opening of the bowl. Although various scraper configurations are available, scrapers are often pulled by a tractor, such as a wheeled or track type tractor. In addition, scrapers may provide their own fraction via a separate engine that applies rim pull, or power, to the wheels of the scraper. Such machines, including both tractor and scraper powertrains, may be referred to as dual powertrain machines.

Conventional methods for limiting the speed of a dual powertrain machine include limiting the top gear in which the tractor powertrain, or primary powertrain, may operate. For example, a gear that may produce a maximum machine speed at or below a machine speed limit may be selected as the top operating gear for the primary powertrain. For powertrains having multiple forward gears, this speed limiting method limits the selection of machine speed limits to a discrete number of maximum speed limits corresponding to the number of gears. Thus, while potentially effective, this method does not allow a wide selection of maximum machine speeds and, further, may be inefficient, particularly when the transmission could operate at a lower engine speed in a higher gear while still maintaining a machine speed below the machine speed limit.

U.S. Pat. No. 6,030,315 to Bellinger discusses a "hold mode" transmission operating condition for a single powertrain machine in which the currently engaged gear is maintained and, further, teaches a system for overriding the hold mode operating condition if such operation is determined to be inappropriate based on a vehicle operating parameter. Although the Bellinger reference teaches other useful applications of the hold mode condition, in addition to machine speed limiting, it recognizes the potential inefficiencies of such a condition and seeks to override the hold mode condition in certain scenarios. Thus, in addition to the inefficiencies cited by Bellinger, a gear hold feature, particularly when used for machine speed limiting, may reduce efficiency, increase fuel consumption, and potentially increase engine wear.

The present disclosure is directed to one or more of the problems set forth above.

SUMMARY OF THE DISCLOSURE

In one aspect, a method of limiting machine speed of a dual powertrain machine includes propelling the dual powertrain machine by transmitting power from a first engine of a first electronically controlled powertrain to a first set of ground engaging elements, and transmitting power from a second engine of a second electronically controlled powertrain to a second set of ground engaging elements. The method also includes identifying a machine speed limit, executing a first machine speed limiting algorithm in a first controller of the first electronically controlled powertrain to determine a first engine control command based on the machine speed limit, and controlling the first engine using the first engine control command. A second machine speed limiting algorithm is executed in a second controller of the second electronically controlled powertrain to determine a second engine control command based on the machine speed limit, and the second engine is controlled using the second engine control command.

In another aspect, a dual powertrain machine includes a first electronically controlled powertrain including a first transmission coupling a first engine and a first set of ground engaging elements. A second electronically controlled powertrain includes a second transmission coupling a second engine and a second set of ground engaging elements. At least one electronic controller is in communication with the first electronically controlled powertrain and the second electronically controlled powertrain. The at least one electronic controller is configured to identify a machine speed limit, execute a first machine speed limiting algorithm to determine a first engine control command based on the machine speed limit, control the first engine using the first engine control command, execute a second machine speed limiting algorithm to determine a second engine control command based on the machine speed limit, and control the second engine using the second engine control command.

DETAILED DESCRIPTION

Figure 1:
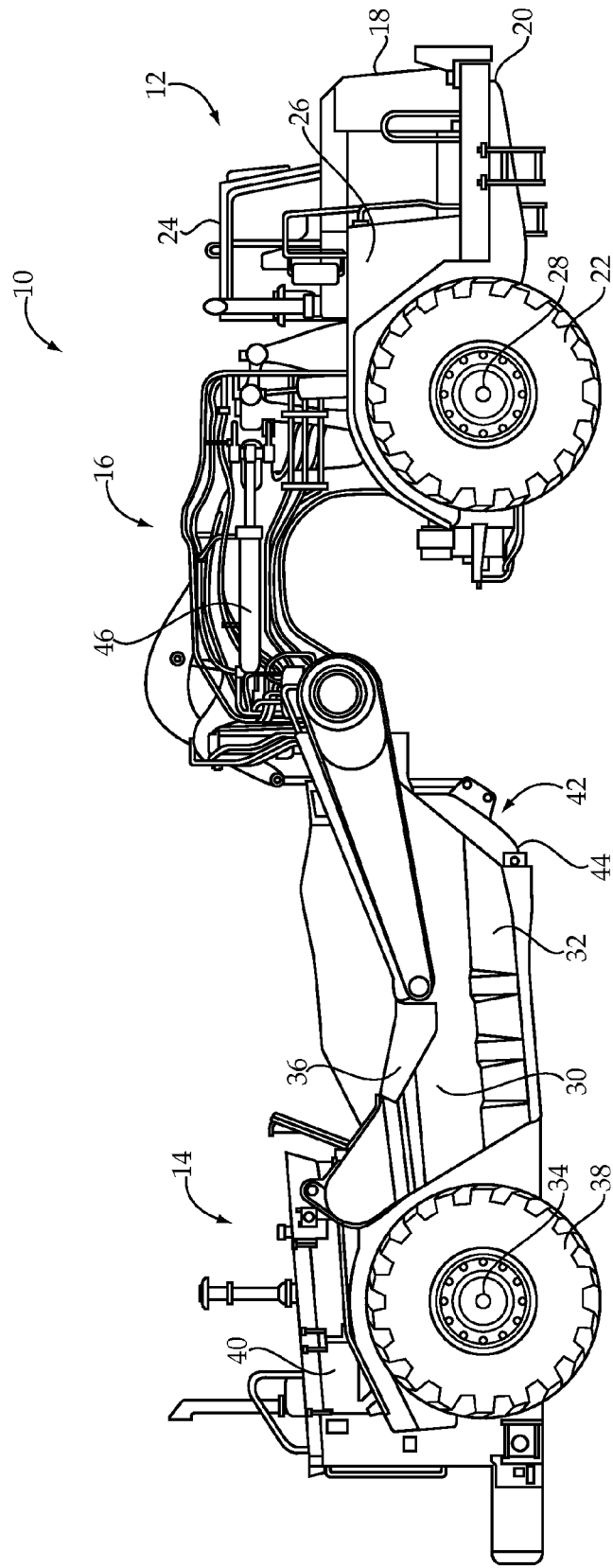
FIG. 1 is a side diagrammatic view of a dual powertrain machine, according to the present disclosure.

An exemplary embodiment of a machine 10 is shown generally in FIG. 1. The machine 10, shown as a tractor scraper, may be an articulated machine having a front portion 12 pivotably attached to a rear portion 14 at an articulated hitch 16. The front portion 12 may include a tractor 18 having a frame 20 supporting, among other systems and components, a first set of ground engaging elements 22, an operator control station 24, and a front engine compartment 26. The front engine compartment 26 may house portions of a first propulsion system, discussed below with reference to FIG. 2, which may provide propulsion means for driving the first set of ground engaging elements 22 through a front axle assembly 28.

The rear portion 14 may include a scraper 30 having a frame 32 supporting at least a rear axle assembly 34 about which a scraper bowl 36 may pivot. The frame 32 may also support a second set of ground engaging elements 38, which may be propelled by the rear axle assembly 34 using a second propulsion system housed within a rear engine compartment 40. The second propulsion system, discussed below in greater detail, may thus, according to such tandem powered arrangements, provide its own power, or traction, for the second set of ground engaging elements 38. The machine 10, having two propulsion systems, may also be referred to herein as a dual powertrain machine.

As should be appreciated by those skilled in the art, the scraper bowl 36 may define a cut opening 42, at a front portion of the scraper bowl 36, with a cutting edge, such as a scraper blade 44, positioned adjacent the cut opening 42. During an exemplary operation, the scraper bowl 36 may be pivoted downward about the axle assembly 34, such as by using one or more scraper bowl actuators or cylinders 46, to engage the scraper blade 44 with material, such as, for example, soil. Such material may be collected within the scraper bowl 36 as the tractor 18 and scraper 30 are maneuvered over the material. Although a simplified embodiment is described, it should be appreciated that scraper 30 may include additional components or features, such as, for example, an auger attachment, elevator mechanism, or ejector.

The operator control station 24, introduced above, may be supported on the front frame 20, and may include known devices, such as, for example, a seat assembly, steering device, and one or more operator displays that facilitate operator control of the tractor 18 and/or scraper 30. The operator control station 24 may include various other devices, including, but not limited to, one or more machine operation controllers. For example, one or more machine operation controllers may be provided for selecting or controlling an engine speed of an internal combustion engine provided within either or both of engine compartments 26 and 40. Further, one or more machine operation controllers may be provided for controlling operation of the scraper 30, such as by controlling movement of the scraper bowl actuators or cylinders 46. Additional controls and devices, as should be appreciated, may also be provided within the operator control station 24 for controlling various operational aspects of the tractor 18 and/or scraper 30 using mechanical, hydraulic, and/or electronic control means.

Figure 2:
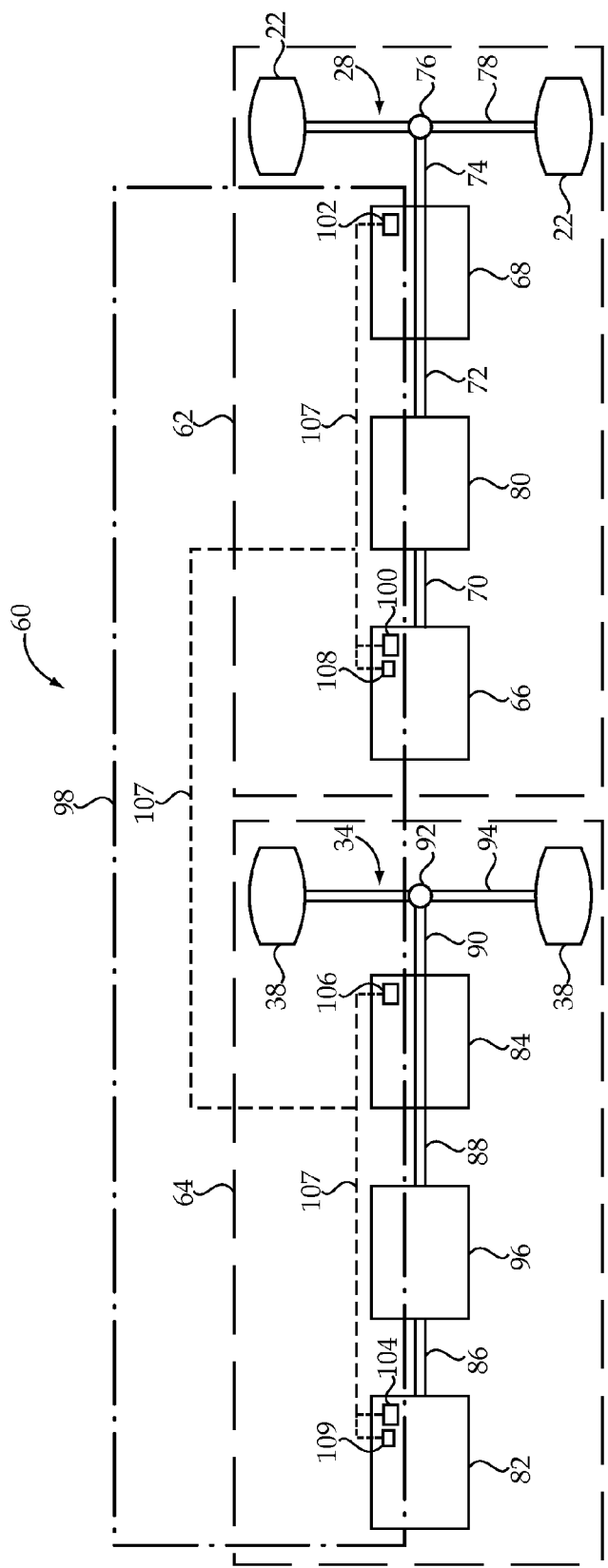
FIG. 2 is a block diagram of first and second electronically controlled powertrains of the dual powertrain machine of FIG. 1, according to the present disclosure.

Turning now to FIG. 2, a dual powertrain system for the machine 10 is shown generally at 60. The dual powertrain system 60 may include a first electronically controlled powertrain 62, also referred to as a front or primary powertrain, and a second electronically controlled powertrain 64, also referred to as a rear or secondary powertrain. The first electronically controlled powertrain 62 may include an electronically controlled engine 66 coupled to the ground engaging elements 22 via a first electronically controlled transmission 68. The power from the first electronically controlled engine 66 may be transmitted to the ground engaging elements 22 via an engine output shaft 70, a transmission input shaft 72, a transmission output shaft 74, a differential 76, and an axle 78 of the front axle assembly 28. The first electronically controlled powertrain 62 may also include a torque converter 80, which may be placed selectively in a locked configuration, using electronic control means, that results in the engine output shaft 70 having the same rotational speed as transmission input shaft 72. When the torque converter 80 is in an unlocked configuration, the speed of shafts 70 and 72 may be different.

According to a specific example, the first electronically controlled transmission 68 may be a conventional powershift transmission including a gear assembly and one or more clutch assemblies configured to provide a plurality of forward and/or reverse gear ratios that correlate to a ratio of the input speed of the transmission 68 to the output speed of the transmission 68. For example, the first electronically controlled transmission 68 may include a plurality of selectable gear ratios to provide eight forward and one reverse speed outputs through the output shaft 74. According to another specific example, the first two gears may operate with the torque converter 80 in an unlocked configuration, according to a converter drive operation mode, such as to provide increased torque capability during certain operations. Gears three through eight may operate with the torque converter 80 in a locked configuration, according to a direct drive operation mode, for increased powertrain efficiency during other operations. Automatic electronic control may selectively transition the first electronically controlled powertrain 62 between the converter drive operation mode and the direct drive operation mode, if such operation modes are desired.

The second electronically controlled powertrain 64 may be similar to the first electronically controlled powertrain 62 and may include a second electronically controlled engine 82 coupled to the ground engaging elements 38 via a second electronically controlled transmission 84. The power from the second electronically controlled engine 82 may be transmitted to the ground engaging elements 38 via an engine output shaft 86, a transmission input shaft 88, a transmission output shaft 90, a differential 92, and an axle 94 of the rear axle assembly 34. The second electronically controlled powertrain 64 may also include a torque converter 96, which may be moved selectively between locked and unlocked configurations. According to a specific example, the second electronically controlled transmission 84 may be a powershift transmission including a plurality of selectable gear ratios to provide four forward and one reverse speed outputs through the output shaft 90. Further, for example, although both a converter drive operation mode and a direct drive operation mode may be available, all gears of the second electronically controlled powertrain 64 may operate in converter drive operation mode, such as to provide increased torque capability.

According to the exemplary embodiment, it may be desirable to maintain similar drive ratios of the first electronically controlled transmission 68 and the second electronically controlled transmission 84 during operation. For example, the first electronically controlled transmission 68 may be designated a master transmission and the second electronically controlled transmission 84 may be designated a follower transmission, with a control strategy shifting the second transmission 84 on set shift points of the first transmission 68. According to the specific example provided above, it may be desirable to match gears two, four, six, and eight of the first transmission 68 with gears one, two, three, and four, respectively, of the second transmission 84. Thus, when the first transmission 68 is in first or second gear, the second transmission 84 is in first gear. When the first transmission 68 is in third or fourth gear, the second transmission 84 is in second gear. When the first transmission 68 is in fifth or sixth gear, the second transmission 84 is in third gear, and when the first transmission 68 is in seventh or eighth gear, the second transmission 84 is in fourth gear. Although specific powertrain configurations are discussed, it should be appreciated that such configurations are provided for exemplary purposes only and the present disclosure has applicability to alternative dual powertrain configurations.

The dual powertrain machine 10 or, more specifically, the dual powertrain system 60 may also include a control system 98 including a plurality of electronic controllers. For example the first electronically controlled powertrain 62 may include at least a first engine controller 100 and a first transmission controller 102. The second electronically controlled powertrain 64 may similarly include at least a second engine controller 104 and a second transmission controller 106. The control system 98 may include more or less electronic controllers, as necessary, to provide desired electronic control of powertrain operations. Further, a main electronic controller may be provided, or one of the electronic controllers 100-106 may be designated the main controller, to coordinate functions and/or facilitate communication within the control system 98.

Each of the electronic controllers 100-106 may be of standard design and may include a processor, such as, for example, a central processing unit, a memory, and an input/output circuit that facilitates communication internal and external to the electronic controllers 100-106. The processor, for example, may control operation of each of the electronic controllers 100-106 by executing operating instructions, such as, for example, computer readable program code stored in the memory, wherein operations may be initiated internally or externally to the electronic controllers 100-106. Control schemes may be utilized that monitor outputs of systems or devices, such as, for example, sensors, actuators, or control units, via the input/output circuit to control inputs to various other systems or devices. The memory, as used herein, may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or nonvolatile data storage devices. One skilled in the art will appreciate that any computer based system or device utilizing similar components for controlling the machine systems or components described herein, is suitable for use with the present disclosure.

Any one or more of the electronic controllers 100-106 may communicate with various systems and components of the machine 10 via one or more wired and/or wireless communications lines 107, or other similar input/output circuits. For example, regarding the first electronically controlled powertrain 62, the electronic controllers 100 and 102 may communicate with one another, with the torque converter 80, and/or with any other systems and/or components, including sensors, actuators, and the like, to perform necessary powertrain operations. Regarding the second electronically controlled powertrain 64, the electronic controllers 104 and 106 may similarly communicate with one another, with the torque converter 96, and with any other systems and/or components of the machine 10. Further, one or more of the electronic controllers 100 and 102 may communicate with any one or more of the electronic controllers 104 and 106. All such communications may occur over the communications lines 107, as stated above, which may include any proprietary communication link or may be a portion of a standardized communication link, such as J1939 data communication network standardized according to the Society of Automotive Engineers (SAE). Thus, the electronic controllers 100-106 may exchange messages according to a proprietary protocol or according to standard messages formulated according to the J1939 network communication standards known in the art, or according to both.

Figure 3:
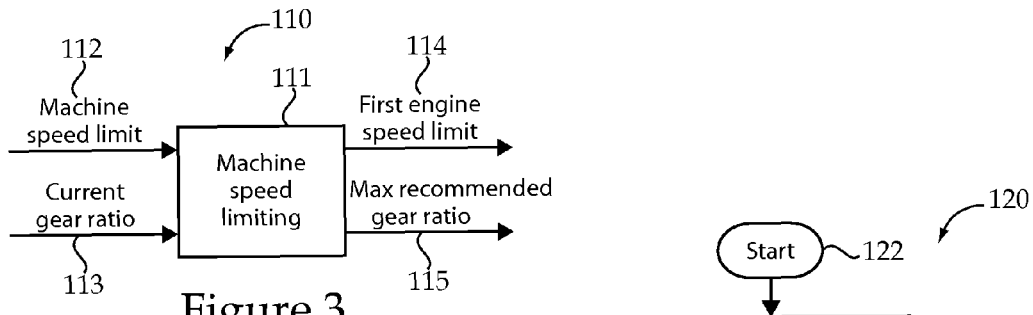
FIG. 3 is a diagrammatic illustration of a first machine speed limiting algorithm, according to the present disclosure.

Referring now to FIG. 3, an example of a first machine speed limiting algorithm for the dual powertrain machine 10 is shown generally at 110. The first machine speed limiting algorithm 110, which will be discussed in greater detail below with reference to FIGS. 5 and 7, may generally include a processor 111, such as one of the electronic controllers 100-106, configured for receiving as inputs a machine speed limit 112 and a current gear ratio 113 of the first electronically controlled transmission 68. Based on the inputs, the processor 114 may determine a first engine speed limit 114 and a maximum recommended gear ratio 115. The first machine speed limiting algorithm 110 may be applicable to the first electronically controlled powertrain 62 and may be further applicable to the direct drive operation mode of the first electronically controlled powertrain 62.

Figure 4:
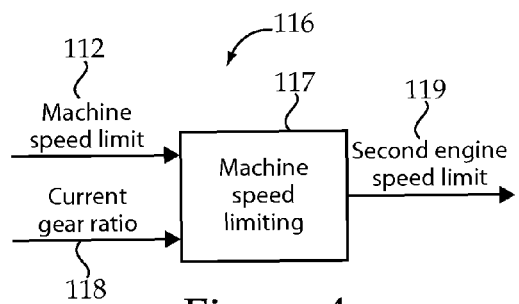
FIG. 4 is a diagrammatic illustration of a second machine speed limiting algorithm, according to the present disclosure.

As shown in FIG. 4, an embodiment of a second machine speed limiting algorithm 116 for the dual powertrain machine 10 may be similar to the first machine speed limiting algorithm 110. The second machine speed limiting algorithm 116 may include a processor 117, which may or may not be the same processor as the processor 111 of FIG. 3, configured for receiving the machine speed limit 112 and a current gear ratio 118 of the second electronically controlled transmission 84. The processor 117 may use the inputs 112 and 118 to determine a second engine speed limit 119. The second machine speed limiting algorithm 116 may be applicable to the second electronically controlled powertrain 64 and may be further applicable to the direct drive operation mode of the second electronically controlled powertrain 64, as will be explained below.

Figure 5:
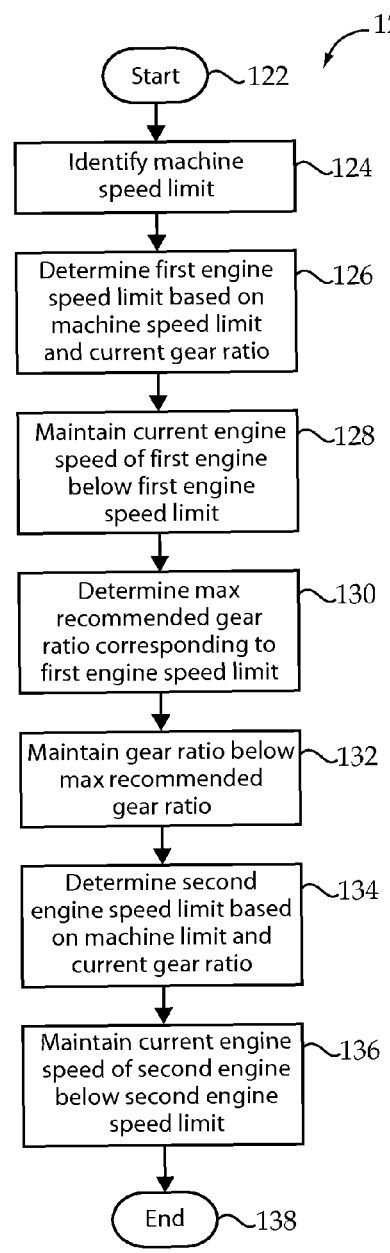
FIG. 5 is a flow chart of one embodiment of a method of limiting machine speed of the dual powertrain machine of FIG. 1, according to the present disclosure.

Turning now to FIG. 5, and referring also to the previous Figures, there is shown a logic flow diagram 120 representing an exemplary machine speed limiting method for the machine 10, according to the present disclosure. The method may be implemented by any one or more of the electronic controllers 100-106, which may or may not correspond to one or both of the processors 111 and 117 discussed above, as will be described herein. According to a specific example, the steps implementing the disclosed method may be in the form of computer readable program code stored in the memory of the first transmission controller 102 and executed by the processor of the first transmission controller 102, or other computer usable medium. The method may run continuously or may be initiated in response to one or more predetermined events, as described below.

The method begins at a START, Box 122. From Box 122, the method proceeds to Box 124, which includes the step of identifying the machine speed limit 112. The machine speed limit 112 may be stored in the memory of one or more of the electronic controllers 100-106 and may be set and/or updated, as necessary, to impose a ground speed limit for the machine 10. Alternatively, or additionally, an operator interface may be provided, such as within the operator control station 24, to facilitate the entry or reconfiguration of the machine speed limit 112, such as, for example, in one kilometer per hour (kph) increments. According to either scenario, the machine speed limit 112 may be stored in at least one of the electronic controllers 100-106 and accessed during execution of the machine speed limiting method.

According to the first machine speed limiting algorithm 110, at Box 126, the electronic controller 102 may determine the first engine speed limit 114 based on the machine speed limit 112 and the current gear ratio 113 of the first electronically controlled engine 66. Specifically, for example, the first engine speed limit 114 may be determined by looking up the current gear ratio 113, such as based on the current gear when the first electronically controlled powertrain 62 is in direct drive operation mode, and then calculating an engine speed limit 114 that would relate to the machine speed limit 112. This maximum allowable speed based on the current gear ratio 113 and the machine speed limit 112 may be broadcast as a first engine control command, also represented generally at 114. The first machine speed limiting algorithm 110 may be executed on the first transmission controller 102, as stated above, or any other controller, with the first engine control command 114 ultimately being used to control the first electronically controlled engine 66. Thus, the machine speed may be limited by, at least, limiting the engine speed of the first electronically controlled engine 66.

At Box 128, the current engine speed of the first electronically controlled engine 66 may be maintained below the first engine speed limit 114 in response to the first engine control command 114. For example, a first electronically controlled engine governor 108 may be used, in a manner known to those skilled in the art, to limit fueling to the first electronically controlled engine 66, as necessary, to maintain a current engine speed below the first engine speed limit 114. Although a first electronically controlled engine governor 108 is disclosed, it should be appreciated that any device or control strategy for maintaining an engine speed below the first engine speed limit 114 may be substituted for the first electronically controlled engine governor 108.

Occasionally, a gear hunting, or shift hunting, event may occur, when the first electronically controlled transmission 68 selects a new gear ratio and subsequently returns to a previous gear ratio. For example, a gear hunting event may occur due to a loss of machine speed during the shift from the old gear ratio to the new gear ratio, when there is not enough power to maintain the machine speed in the new gear ratio, or according to a variety of other conditions or factors. To reduce occurrence of such a gear hunting event, an anti-hunt strategy may be incorporated into the first machine speed limiting algorithm. Specifically, for example, the electronic controller 102 may determine a maximum recommended gear ratio 115 corresponding to the first engine speed limit 114, at Box 130. This may be stored in the memory of one of the controllers 100-106 and may be used as a reference by a conventional shifting strategy according to predetermined shift points. Specifically, the conventional shifting strategy may ensure the current gear ratio is maintained below the maximum recommended gear ratio 115 for the engine speed limit 114, at Box 132.

According to the second machine speed limiting algorithm, at Box 134, the electronic controller 102 or another controller, such as the second transmission controller 106, may determine a second engine speed limit 119 based on the machine speed limit 112 and a current gear ratio 118 of the second electronically controlled engine 82. Specifically, for example, the second engine speed limit 119 may also be determined by looking up the current gear ratio 118, such as when the second electronically controlled powertrain 64 is in a direct drive operation mode, and then calculating the engine speed limit 119 that would relate to the machine speed limit 112. This maximum allowable speed based on the current gear ratio 118 of the second electronically controlled engine 82 and the machine speed limit 112 may be broadcast as a second engine control command, also represented generally at 119. The second machine speed limiting algorithm 116 may be executed on the first transmission controller 102 or the second transmission controller 106, or any other controller, with the second engine control command 119 ultimately being used to control the second electronically controlled engine 82.

At Box 136, the current engine speed of the second electronically controlled engine 82 may be maintained below the second engine speed limit 119 in response to the second engine control command 119. For example, a second electronically controlled engine governor 109 may be used, in a manner known to those skilled in the art, to limit fueling to the second electronically controlled engine 82, as necessary, to maintain an engine speed below the second engine speed limit 119. Although a second electronically controlled engine governor 109 is disclosed, it should be appreciated that any device or control strategy for maintaining an engine speed of the second electronically controlled engine 82 below the second engine speed limit 119 may be substituted for the second electronically controlled engine governor 109. After executing both machine speed limiting algorithms 110 and 116, the method proceeds to an END, at Box 138. Such a method may run continuously, at predetermined intervals, or under certain operation conditions, such as when a machine speed limit is identified.

Figure 6:
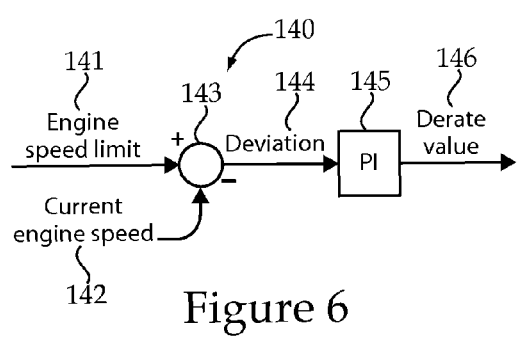
FIG. 6 is a diagrammatic illustration of a strategy for controlling the secondary powertrain of the dual powertrain machine of FIG. 1, according to the present disclosure.

Rather than setting an engine speed limit, such as first and second engine speed limits 114 and 119, for either or both of the first and second electronically controlled engines 66 and 82, a machine speed limiting method according to the present disclosure may control a power output, or torque output, of the engines 66 and 82 using a feedback loop, such as a proportional-integral (PI) feedback loop or a proportional-integral-derivative (PID) feedback loop. According to a general example, shown in FIG. 6, an alternative machine speed limiting algorithm 140 may subtract an engine speed limit 141 from a current engine speed 142 at a summer 143 to arrive at a deviation 144, or error. The deviation 144 may be supplied in a standard manner to a PI controller 145 to arrive at a power limit, or derate value 146. This alternative machine speed limiting algorithm 140 may be applicable to either of the first and second electronically controlled powertrains 62 and 64 and may be further applicable to the converter drive operation mode of either of the electronically controlled powertrains 62 and 64.

Figure 7:
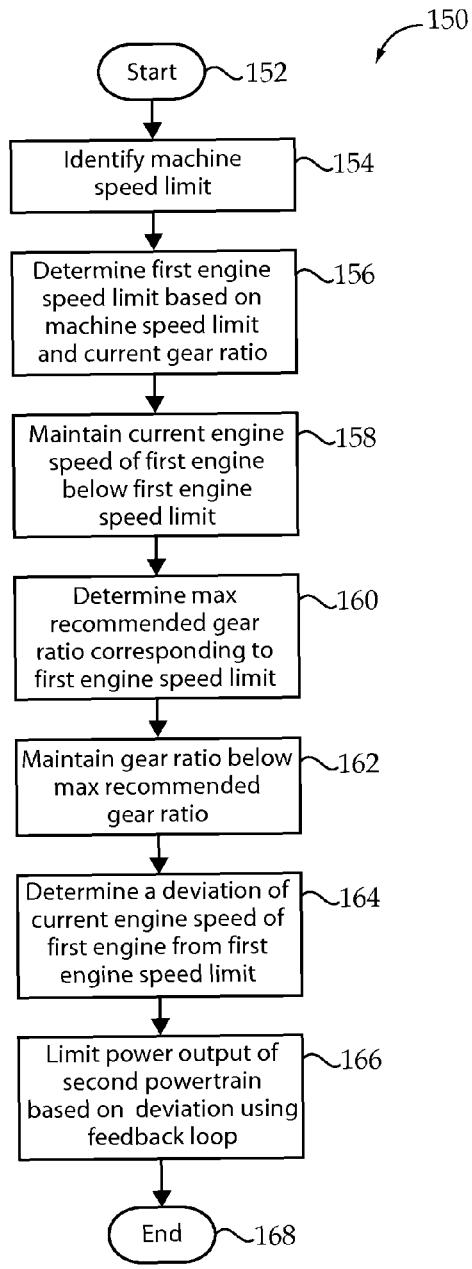
FIG. 7 is a flow chart of another embodiment of a method of limiting machine speed of the dual powertrain machine of FIG. 1, according to the present disclosure.

A specific example of a machine speed limiting method incorporating the alternative speed limiting algorithm 140 is shown in a logic flow diagram 150 of FIG. 7. The method, which may have similarities to the method of FIG. 5, begins at a START, Box 152. From Box 152, the method proceeds to Box 154, which includes the step of identifying the machine speed limit 112. According to the first machine speed limiting algorithm 110, at Box 156, the electronic controller 102 may determine the first engine speed limit 114 based on the machine speed limit 112 and the current gear ratio 113 of the first electronically controlled engine 66. At Box 158, the current engine speed of the first electronically controlled engine 66 may be maintained below the first engine speed limit 114 in response to the first engine control command 114, such as by using the first electronically controlled engine governor 108, introduced above. The method of FIG. 4 may also include the gear hunting avoidance strategy described above, and shown at Box 160 and Box 162.

According to the alternative machine speed limiting algorithm 140, at Box 154, the electronic controller 102 or another controller, such as the second transmission controller 106, may determine the deviation 144 of the current engine speed 142 of the first electronically controlled engine 66 from the first engine speed limit 141, 114, calculated above. The electronic controller 102 or 106 may limit a power output of the second electronically controlled engine 82 based on the deviation 144 using a feedback loop. Specifically, the PI controller 145 may be used to adjust, or maintain, the engine speed of the first electronically controlled engine 66 toward the first engine speed limit 141, 114 by adjusting the power, or torque, output of the second electronically controlled engine 82. It should be appreciated that various measurements and/or calculations may be used to arrive at power or torque values, including measurements of fuel flow, engine speed, air pressure, air temperature, and the like. Further, it should be appreciated that the PI controller 145 may include any of a number of features, including anti-windup and saturation features, as are known by those skilled in the art.

Figure 8:
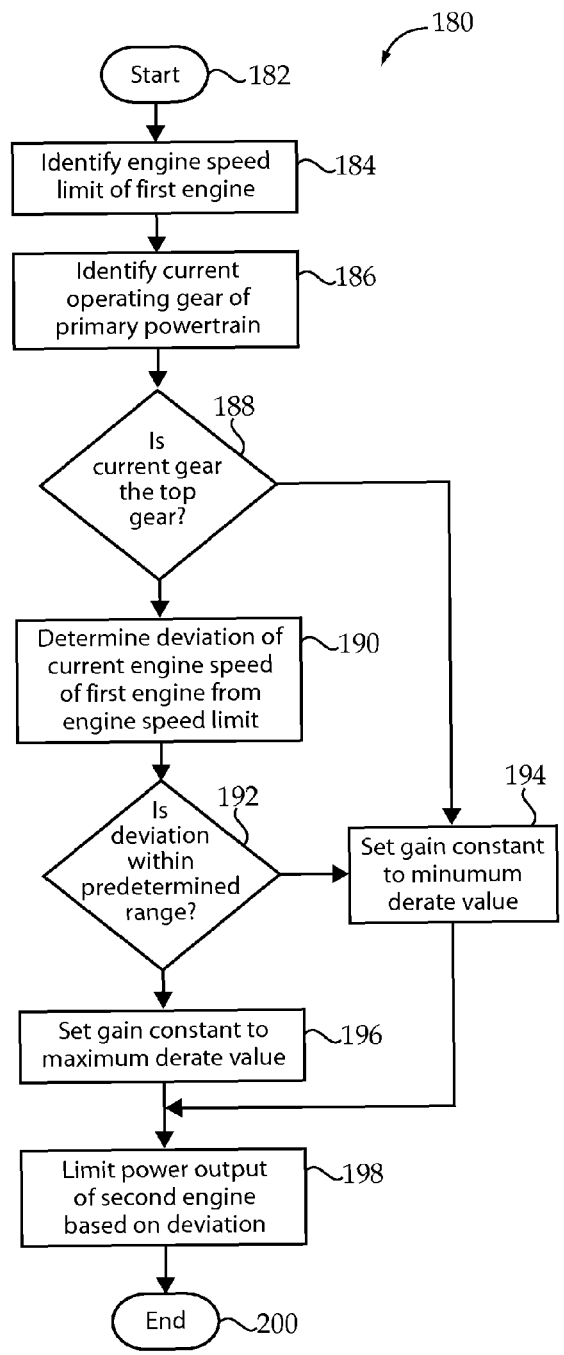
FIG. 8 is a flow chart of one embodiment of a method of controlling power output of the secondary powertrain of the dual powertrain machine of FIG. 1, according to the present disclosure.

Turning now to FIG. 8, there is shown a logic flow diagram 180 representing an exemplary control method for the machine 10 or, more specifically, the second electronically controlled powertrain 64, according to the present disclosure. The method may be implemented by any one or more of the electronic controllers 100-106, as will be described herein. According to one example, the steps implementing the disclosed method may be in the form of computer readable program code stored in the memory of the first transmission controller 102 and executed by the processor of the first transmission controller 102, or other computer usable medium. The method may run continuously or may be initiated in response to one or more predetermined events, as described below. Further, as stated above, the method of FIG. 8 may be applicable to the second electronically controlled powertrain 64 and may be similar to the alternative machine speed limiting algorithm 140 of FIG. 6. The method of FIG. 8 may, therefore, be used as part of a machine speed limiting method, such as the methods of FIGS. 5 and 7, and/or may be used independently.

The method begins at a START, Box 182. From Box 182, the method proceeds to Box 184, which includes the step of identifying the engine speed limit 141 of the first electronically controlled engine 66. According to some embodiments, the engine speed limit 141 may correspond to a high idle speed for the first electronically controlled engine 66. According to other embodiments, for example, the engine speed limit 141 may be based on the machine speed limit 112 and the current gear ratio 113 of the first electronically controlled powertrain 62, such as the first engine speed limit 114.

At Box 186, a current operating gear of the first electronically controlled powertrain 62, or primary powertrain, is identified. The current operating gear is then compared to the top gear for the first electronically controlled powertrain 62, at Box 188. For example, the top gear may represent the highest gear of the first electronically controlled transmission 68. Alternatively, however, a top gear may be identified using a gear hold feature, as is known in the art. The gear hold feature may allow an operator to effectively lock the first electronically controlled transmission 68 in any desired gear. As such, if the gear hold feature is active, the gear being maintained according to the gear hold feature will be used as the top gear. If the first electronically controlled powertrain 62 is operating in the top gear, the method proceeds to Box 190.

At Box 190, the electronic controller 102 determines the deviation 144 of the current engine speed 142 of the first electronically controlled engine 66 from the engine speed limit 141 of the first engine 66. The deviation 144 is then compared, at Box 192, to a predetermined range. If the deviation 144 is not within the predetermined range, or the first electronically controlled powertrain 62 is not operating in the top gear, as determined at Box 188, a gain constant is set to a minimum derate value, at Box 194. If, however, the deviation falls within the predetermined range, the gain constant is set to a maximum derate value, at Box 196. The method then proceeds to Box 198, which includes a step of limiting the power output of the second engine 82 based on the deviation 144 using the derate value 146. The method then proceeds to an END, at Box 200.

The method of FIG. 8 may work in conjunction with a transmission control strategy to determine the current operating mode of the machine 10 and limit the second electronically controlled powertrain 64 in situations when the second electronically controlled powertrain 64 is capable of pushing the first electronically controlled powertrain 62 past a gear specific runout speed, as indicated by the predetermined range. Thus, during these operations, such as when the first electronically controlled powertrain 62 is in the top gear and the first electronically controlled engine 66 is at or near maximum speed, particularly during direct drive operation mode of the first electronically controlled powertrain 62 and converter drive operation mode of the second electronically controlled powertrain 64, the secondart powertrain 64 may be limited using the method of FIG. 8. As should be appreciated, the steps of the methods disclosed herein do not have to be performed in any particular order, nor do all of the steps have to be included.

INDUSTRIAL APPLICABILITY

The present disclosure may be applicable to machines having a first electronically controlled powertrain for driving a first set of ground engaging elements and a second electronically controlled powertrain for driving a second set of ground engaging elements. Further, the present disclosure may be applicable to such dual powertrain machines requiring control strategies responsive to machine speed conditions. Yet further, the present disclosure may be applicable to dual powertrain machines requiring improved efficiency, including reduced energy consumption, during operations.

Referring generally to FIGS. 1-8, a dual powertrain machine 10 may be an articulated machine having a front portion 12, or tractor 18, pivotably attached to a rear portion 14, or scraper 30, at an articulated hitch 16. The tractor 18 may include a first electronically controlled powertrain 62 for driving a first set of ground engaging elements 22, while the scraper 30 may include a second electronically controlled powertrain 64 for driving a second set of ground engaging elements 38. The first, or primary, electronically controlled powertrain 62 may include a first electronically controlled engine 66 coupled to the ground engaging elements 22 via a first electronically controlled transmission 68. The power from the engine 66 may be transmitted to the ground engaging elements 22 via an engine output shaft 70, a transmission input shaft 72, a transmission output shaft 74, a differential 76, and an axle 78 of the front axle assembly 28. The first electronically controlled powertrain 62 may also include a torque converter 80 positioned between the first electronically controlled engine 66 and the first electronically controlled transmission 68, and having a locked configuration and an unlocked configuration.

The second electronically controlled powertrain 64 may be similar to the first electronically controlled powertrain 62 and may include a second electronically controlled engine 82 coupled to the ground engaging elements 38 via a second electronically controlled transmission 84. The power from the second electronically controlled engine 82 may be transmitted to the ground engaging elements 38 via an engine output shaft 86, a transmission input shaft 88, a transmission output shaft 90, a differential 92, and an axle 94 of the rear axle assembly 34. The second electronically controlled powertrain 64 may also include a torque converter 96, which may be moved selectively between locked and unlocked configurations. According to a specific example, both of the electronically controlled powertrains 62 and 64 may include a direct drive operation mode and a converter drive operation mode.

The dual powertrain machine 10 may be propelled by transmitting power from the first electronically controlled engine 66 to the first set of ground engaging elements 22, and transmitting power from the second electronically controlled engine 82 to the second set of ground engaging elements 38. During certain operations or at particular work sites, it may be desirable to limit the machine speed of the dual powertrain machine 10. Such machine speed limiting may be accomplished using the machine speed limiting methods disclosed herein. Specifically, as shown in the logic flow diagram 120 of FIG. 5, a machine speed limit 112 may be stored in the memory of one or more of the electronic controllers 100-106 and/or input using an operator interface. First and second machine speed limiting algorithms 110 and 117 may then be executed to determine first and second engine control commands 114 and 119 based on the machine speed limit 112.

Alternatively, one or both of the first and second machine speed limiting algorithms 110 and 117 may control the power, or torque, output of the engine 66, 82 using a feedback loop. Specifically, for example, a deviation 144 of a current engine speed 142 of the first electronically controlled engine 66 from the first engine speed limit 141, 114 may be calculated, and the deviation 144, or error, may be used to limit power, or torque, of the second electronically controlled engine 82 based on a derate value 146. Specifically, for example, a PI controller 145 may be used to reduce the deviation 144, or error, by adjusting the power, or torque, output of the second electronically controlled engine 82.

Either of the methods, or noted variations, may be used to effectively maintain a machine speed of the dual powertrain machine 10 below a machine speed limit 112. Such methods may prove to be effective and more efficient than conventional machine speed limiting methods, which may include using a gear hold feature for the first electronically controlled powertrain 62. Specifically, by controlling one or both of the electronically controlled powertrains 62 and 64 to limit the engine speed or power output of the respective engine 66, 82 based on the current gear and the machine speed limit 112, and allowing the respective powertrain 62, 64 to shift to a higher gear at a lower engine speed, significant fuel savings may be recognized. Further, rather than providing a discrete number of machine speed limits corresponding to the maximum machine speed for each gear, the methods disclosed herein allow for a wider selection of machine speed limits.

According to an additional aspect, the control method of FIG. 8 may be used independently to achieve greater efficiency and reduce occasions where the second electronically controlled powertrain 64 pushes the first electronically controlled powertrain 62. Specifically, the method of controlling power output of the second electronically controlled powertrain 64, as discussed above with reference to FIG. 8, may include a strategy for limiting the second electronically controlled powertrain 64 in runout conditions. Runout conditions may occur when the first electronically controlled powertrain 62 reaches a maximum speed in the top gear and, thus, the machine 10 is being propelled at a runout speed. The strategy described herein will reduce the inefficiency that occurs when the second electronically controlled powertrain 64 overruns the first electronically controlled powertrain 62 in these runout conditions.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of limiting machine speed of a dual powertrain machine, comprising:
    propelling the dual powertrain machine by transmitting power from a first engine of a first electronically controlled powertrain to a first set of ground engaging elements and transmitting power from a second engine of a second electronically controlled powertrain to a second set of ground engaging elements;
    identifying a machine speed limit;
    executing a first machine speed limiting algorithm in a first controller of the first electronically controlled powertrain to determine a first engine control command based on the machine speed limit;
    controlling the first engine using the first engine control command;
    executing a second machine speed limiting algorithm in a second controller of the second electronically controlled powertrain to determine a second engine control command based on the machine speed limit; and
    controlling the second engine using the second engine control command.

2. The method of claim 1, wherein the first executing step includes calculating a first engine speed limit based on the machine speed limit and a current gear ratio of the first electronically controlled powertrain.

3. The method of claim 2, wherein the first controlling step includes maintaining a current engine speed of the first engine below the first engine speed limit using an electronically controlled engine governor.

4. The method of claim 3, further including:
    determining a maximum recommended gear ratio corresponding to the first engine speed limit; and
    maintaining a gear ratio of the first electronically controlled powertrain below the maximum recommended gear ratio.

5. The method of claim 2, wherein the second executing step includes calculating a second engine speed limit based on the machine speed limit and a current gear ratio of the second electronically controlled powertrain.

6. The method of claim 5, wherein the second controlling step includes maintaining a current engine speed of the second engine below the second engine speed limit using an electronically controlled engine governor.

7. The method of claim 2, wherein the second executing step includes determining a deviation of a current engine speed of the first engine from the first engine speed limit, and the second controlling step includes limiting a power output of the second electronically controlled powertrain based on the deviation using a feedback loop.

8. The method of claim 7, further including:
    setting a gain constant for the feedback loop to a maximum derate value if the deviation is within a predetermined range and the first electronically controlled powertrain is operating in a top gear; and
    setting the gain constant for the feedback loop to a minimum derate value if the deviation is outside of the predetermined range or the first electronically controlled powertrain is operating in a gear other than the top gear.

9. A dual powertrain machine, comprising:
a first electronically controlled powertrain including a first transmission coupling a first engine and a first set of ground engaging elements;
a second electronically controlled powertrain including a second transmission coupling a second engine and a second set of ground engaging elements; and
at least one electronic controller in communication with the first electronically controlled powertrain and the second electronically controlled powertrain, wherein the at least one electronic controller is configured to identify a machine speed limit, execute a first machine speed limiting algorithm to determine a first engine control command based on the machine speed limit, control the first engine using the first engine control command, execute a second machine speed limiting algorithm to determine a second engine control command based on the machine speed limit, and control the second engine using the second engine control command.

10. The dual powertrain machine of claim 9, wherein the at least one electronic controller is further configured to calculate a first engine speed limit based on the machine speed limit and a current gear ratio of the first transmission.

11. The dual powertrain machine of claim 10, wherein the at least one electronic controller is further configured to control an electronically controlled engine governor to maintain a current engine speed of the first engine below the first engine speed limit.

12. The dual powertrain machine of claim 11, wherein the at least one electronic controller is further configured to determine a maximum recommended gear ratio corresponding to the first engine speed limit, and maintain a gear ratio of the first transmission below the maximum recommended gear ratio.

13. The dual powertrain machine of claim 10, wherein the at least one electronic controller is further configured to calculate a second engine speed limit based on the machine speed limit and a current gear ratio of the second transmission.

14. The dual powertrain machine of claim 13, wherein the at least one electronic controller is further configured to control an electronically controlled engine governor to maintain a current engine speed of the second engine below the second engine speed limit.

15. The dual powertrain machine of claim 10, wherein the at least one electronic controller is further configured to determine a deviation of a current engine speed of the first engine from the first engine speed limit, and limit a power output of the second electronically controlled powertrain based on the deviation using a feedback loop.

16. The dual powertrain machine of claim 15, wherein the at least one electronic controller is further configured to set a gain constant for the feedback loop to a maximum derate value if the deviation is within a predetermined range and the first transmission is operating in a top gear, and set the gain constant for the feedback loop to a minimum derate value if the deviation is outside of the predetermined range or the first transmission is operating in a gear other than the top gear.

17. The dual powertrain machine of claim 9, wherein the first electronically controlled powertrain corresponds to a front portion of an articulated machine and the second electronically controlled powertrain corresponds to a rear portion of the articulated machine.

18. The dual powertrain machine of claim 17, wherein the first and second electronically controlled powertrains include a direct drive operation mode and a converter drive operation mode.

* * * * *